Oct. 16, 1962 L. E. DONAHUE 3,058,664
AIR CONDITIONING CONTROL APPARATUS HAVING
TEMPERATURE AND PRESSURE CONTROL
Original Filed Aug. 31, 1954 2 Sheets-Sheet 1

INVENTOR
LAWRENCE E. DONAHUE

BY *Joseph E. Ryan*

ATTORNEY

Oct. 16, 1962 L. E. DONAHUE 3,058,664
AIR CONDITIONING CONTROL APPARATUS HAVING
TEMPERATURE AND PRESSURE CONTROL
Original Filed Aug. 31, 1954 2 Sheets-Sheet 2

INVENTOR
LAWRENCE E. DONAHUE
BY *Joseph E. Ryan*
ATTORNEY

United States Patent Office 3,058,664
Patented Oct. 16, 1962

3,058,664
AIR CONDITIONING CONTROL APPARATUS HAVING TEMPERATURE AND PRESSURE CONTROL
Lawrence E. Donahue, Mount Prospect, Ill., assignor to Minneapolis-Honeywell Regulator Company, Minneapolis, Minn., a corporation of Delaware
Continuation of application Ser. No. 453,366, Aug. 31, 1954. This application Dec. 23, 1960, Ser. No. 77,925
7 Claims. (Cl. 236—13)

This invention relates to an improved air conditioning control apparatus and more particularly to a unit blender or mixing box control which receives tempered air from hot and cold air supplies and mixes it within the blender or mixing box, discharging it at a controlled volume and temperature from a discharge opening therein to the space or room to be air conditioned and in which the temperature is being controlled. This application is a continuation of my application Serial No. 453,366, filed August 31, 1954, and entitled, "Air Conditioning Control Apparatus Having Temperature and Pressure Control."

The air conditioning control apparatus of this invention is an improvement over the control apparatus disclosed in the copending application to Frederick D. Joesting, Serial No. 364,356, now Patent 2,835,499, dated May 20, 1958, on "Air Blender for Air Conditioning Having Temperature and Pressure Control" and the application of Paul G. Salerno, Serial No. 373,420, now Patent 2,815,915, dated December 10, 1957, on "Air Mixing Apparatus Having Temperature and Pressure Control." In the control apparatus of these patents both the hot and cold supply of air to the blender unit are controlled by a temperature responsive control responsive to room temperature so that the temperature of the mixed air being discharged from the blender is at a desired value sufficient to meet the conditioning load of the room. The blender output is regulated by a pressure responsive controller responsive to the pressure differential across the discharge opening of the blender to override the temperature controller and proportionally control both the hot and cold air supplies. The pressure controller maintains a constant volume output of tempered air from the blender unit. However, this apparatus requires control lines from the thermostat and pressure control to both motors or valves.

In the present invention the hot supply or the amount of hot tempered air supplied to the unit ventilator is controlled in accordance with the temperature of the space or room and the cold supply or the tempered air at the different temperature is controlled by the pressure differential between the blender mixing chamber and the space or in accordance with the total volume of outflow from the blender to provide a constant flow from the mixing chamber. The hot air supply is controlled also in accordance with the pressure supply to the hot air valve such that a constant amount of hot tempered air will be delivered from this valve independent of a pressure variation in the supply line for given thermostat settings. In the operation of the mixing chamber, an increase in the total flow through the hot air valve upon a call for heat will increase the total volume of air in the mixing chamber causing the pressure control responding to the pressure differential indicative of total out flow from the mixing chamber to control the cold supply valve toward a closed direction to maintain a constant volume of outflow from the mixing chamber. Similarly a decrease in flow of air through the warm air valve with a satisfaction of space temperature or a rise above set point will cause the hot supply valve to close, reducing pressure in the blending chamber and causing the cold supply valve to open through change in pressure differential so that a constant flow of air is maintained in the discharge opening of the blender. The unit blender is controlled by a remotely located thermostat requiring only one line or tube to connect to the blender and thermostat, this being a distinct advantage over earlier apparatus.

The location of the supply inlets to the blender are selected to give proper mixing of the hot and cold air in the blender mixing chamber; however, a transition member is provided so that a more adequate mixing of the air is obtained before discharging from the blender. This proper mixing of the air before it discharges from the blender provides for more adequate temperature control and ventilation of the space.

It is therefore an object of this invention to provide an improved temperature control apparatus for a high pressure double duct air conditioning system.

It is further an object of this invention to provide an improved air conditioning control apparatus for a double duct air conditioning system in which the unit blender is controlled in such a manner that one valve controls tempered air at one temperature in accordance with the temperature requirements of the space to be air conditioned and independent of supply line pressure variations while a second valve controls tempered air at a second temperature in accordance with a predetermined pressure differential between plenum and space pressure to provide a constant outflow from the unit blender apparatus.

It is also an object of this invention to provide an improved valve apparatus applicable to air conditioning control apparatus in which the valve is controlled in response to supply pressure applied thereto to provide a constant outflow from the valve and is also controlled by temperature to vary the outflow in accordance with the temperature requirements.

These and other objects of this invention will become apparent from a reading of the attached description together with the drawings wherein.

Figure 1:
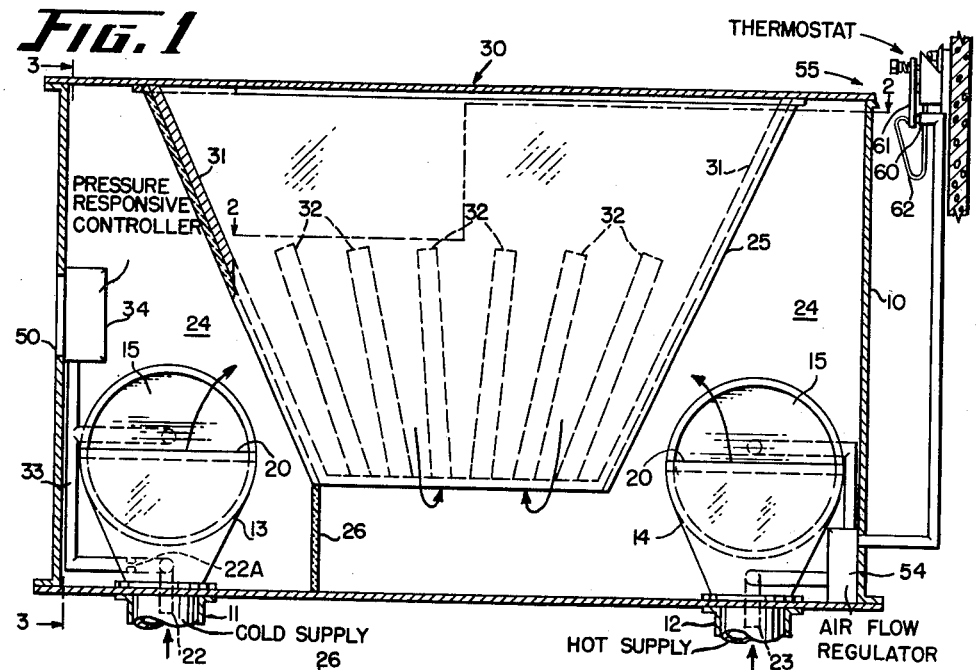
FIGURE 1 is a front cut-away view of a unit blender showing the valves for controlling air flow through the cold supply and hot supply inlet conduits.
Figure 2:
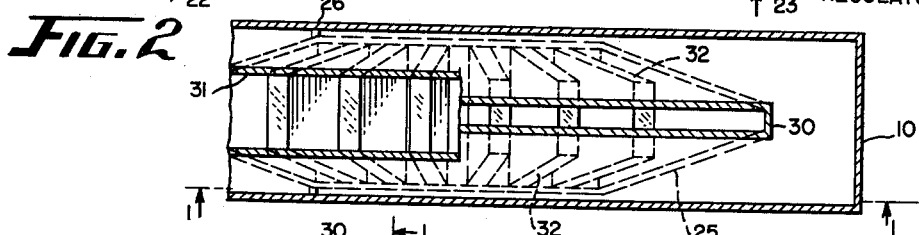
FIGURE 2 is a portion of the top cut-away view of the unit blender shown in FIGURE 1.
Figure 3:
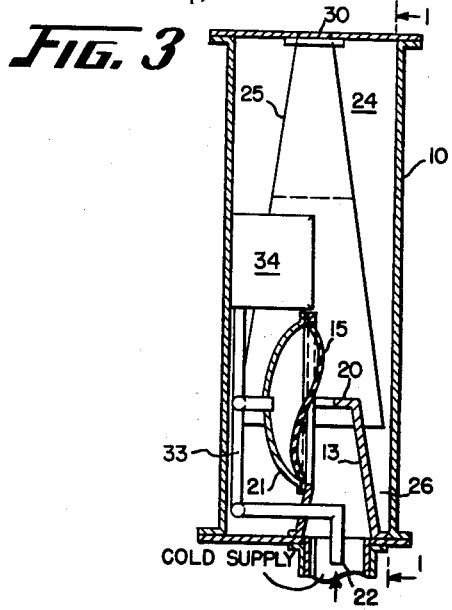
FIGURE 3 is a side cut-away view of the unit blender shown in FIGURE 1.

In FIGURE 1 the air blender 10 is shown as having connected thereto hot and cold supply ducts 11 and 12, respectively. When the blender apparatus is used for heating, the supply duct 12 contains tempered air sufficient to meet the heating requirements of the space to be air conditioned and the cold duct will normally have recirculated air or fresh air at a lower temperature than the hot supply duct 12. When the unit blender is used for cooling, the supply pipes are normally reversed in their connection to the valves 13, 14. The tempered cold air supply is connected to the cold supply duct 11, and the hot supply duct receives normally recirculated air or outside air at a higher temperature level than the cold supply, but their connection to the valves 13, 14 are reversed so that the primary control with thermostat will be connected to the cold duct. Connected to or included in the supply ducts 11, 12 at the blender 10 are a pair of self-contained valves 13 and 14 which control the flow of tempered air from the respective cold and hot supply ducts. These valves are substantially similar and it will be seen in FIGURE 3 that each has a domed diaphragm 15 which is positioned above a weir 20 of similar curvature. The diaphragm and weir are contained in a smoothly contoured valve body 21 suitably attached to the inlet air conduits. When air under pressure is introduced through pickup tubes 22, 23 located on the supply sides of the cold and hot valves or in the supply conduits 11 and 12, it is directed into the chamber behind the respective diaphragms of the valves to force the diaphragms against the weirs and effect a valve closure in a conventional manner for a self-contained valve. The pickup tube 22, as shown in FIGURE 1, includes restriction 22a, which provides a definite pressure source behind the diaphragm or in the motive chambers of valve 13 which will be controlled in a manner later to be described.

The blender contains a transition member 25 having a substantially rectangular cross-section at the lower and upper ends, the cross-sectional dimensions of the member getting longer and narrower as measured at the lower end to the upper end. The relatively constant cross-sectional area provides for an efficient movement of air through the transition member upon entering the lower end from plenum or mixing chamber 24 to exit through the long and narrow discharge opening 30 at the upper surface of the unit blender. The innermost surface of the transition member 25 is covered with a sound deadening lining 31 which provides for sound absorption as the air flows through the transition member. The flow is assisted by a plurality of splitters 32 positioned inside the transition member parallel to the direction of air flow, these reducing the turbulence as well as absorbing sound developed by the air flow. The splitters are also made from a sound absorbing material. A partition 26 extends crosswise of blender 10, it being connected to the narrow edge of the lower end of transition member 25, to cause air from the cold supply to flow around member 25 and mix with the hot supply before entering the lower end of member 25.

Referring to valve 13 air enters pickup tube 22 and is directed into the motive chamber behind diaphragm 15 by a conduit 33. The pressure developed in the valve diaphragm chamber is controlled by a pressure responsive controller 34 which responds to the pressure differential between mixing chamber 24 and the space in which the temperature is being controlled. While it is shown mounted on one side of blender 10, it might be mounted anywhere to respond to mixing chamber and space pressures.

Figure 4:
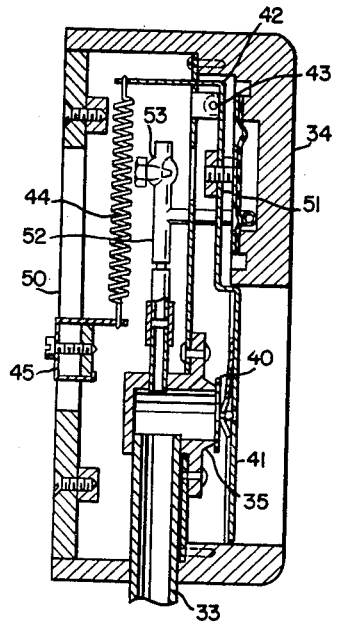
FIGURES 4 and 5 are a side cutaway and a front view, respectively, of a pressure responsive controller used to control one supply valve in the unit ventilator of FIGURE 1.
Figure 5:
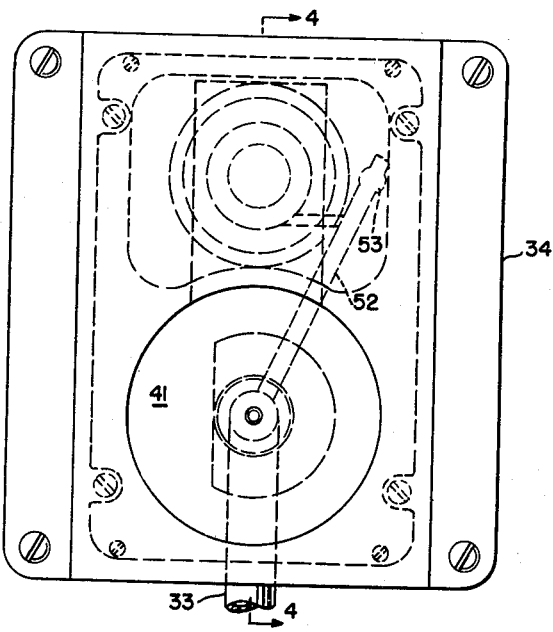

Referring to FIGURE 4, controller 34, which is a total flow regulator control, is shown having a valve seat 35 connected to conduit 33. A valve seating head or closure member 40 cooperating with valve seat 35 is connected to a disc 41 supported on a lever 42 pivoted about a point 43, the lever being spring biased by spring 44 in a direction to lift valve head 40 off the valve seat. The tension on spring 44 is adjusted by a movable bracket 45 so that a predetermined pressure differential across disc 41 is necessary to close the valve. The front side of disc 41 is exposed to the pressure in mixing chamber 24 and the opposite side of disc 41 is exposed to the pressure of the space as an opening 50 in the blender wall is sufficiently large enough that the pressure inside controller 34 is substantially the same as the space. The differential between mixing chamber and space pressures is indicative of the total flow across the outlet of the mixing box and hence a measure of total outflow to provide the control pressure differential for the flow regulator 34. Connected in an adjustable manner to lever 42 between pivot point 43 and disc 41 is a compensating slack diaphragm 51. The closed chamber under diaphragm 51 is connected through a restricted conduit 52 to conduit 33 so that a force is added to the seating head 40 through lever 42 in a direction to assist in closing the valve in addition to the force developed by main disc 41. This additional force is proportional to the pressure in conduit 33 and compensates for the pressure in conduit 33 acting on valve head 40 at valve seat 35. The effect of this compensating diaphragm is adjustable by a variable bleed 53 connected on the downstream side of the restricted conduit 52. With the bleed fully open the effect of the compensating diaphragm 51 on valve head 40 is negligible. The variable bleed 53 will be adjusted so that the effect of the compensating diaphragm 51 is sufficient to just offset the force under valve 40 but not too great to cause unstable conditions of operation of valve 40. The effect of compensating diaphragm 51 is to anticipate the effect of any changes in pressure within the cold supply conduit 11. Any change in pressure within conduit 11 would tend to build up the pressure in mixing chamber 24. This would in turn act on disc 41 to move valve 40 towards its seat to cause the diaphragm 15 to move toward weir 20 to reduce the flow through valve 13 and mixing chamber pressure and hence total discharge flow to the desired value. Because of the compensating diaphragm 51, it is not necessary under pressure surge conditions to wait until the pressure surges actually increase the pressure in the mixing chamber for the valve 40 to be adjusted to compensate upon an increase in pressure in conduit 11. As soon as such a rapid increase in pressure takes place, the pressure in conduit 33 rises and increases the pressure on the right-hand side of diaphragm 51 to offset both the pressure increase under valve 40 tending to open the valve and causes valve 40 to move towards its seat, thus causing an adjustment of valve diaphragm 15 before any appreciable change in plenum pressure takes place.

Figure 6:
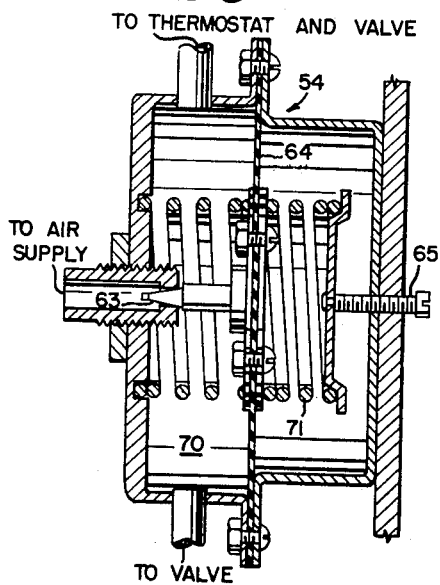
FIGURE 6 is a side cut-away view of a pressure responsive flow control device.

The hot supply valve 14, which is also of the self-contained type, is controlled from an air flow regulator 54 of the sort shown in FIGURE 6. Supply pressure to the valve is supplied through the pickup tube 23 which is connected to the air flow regulator to control the pressure supplied under the motive chamber behind the diaphragm of the valve 14. In addition to the control of the air flow regulator, this valve is also controlled by the thermostat 55 which is shown as of the conventional type having a nozzle 60 with a spring loaded flapper thereon for controlling bleed of the air through the connection to the thermostat from the air flow regulator. The position of the flapper with respect to the nozzle determines the bleed rate, this position being controlled by the temperature sensitive bimetal element 62 mounting the flapper and responding to temperature of the space or room temperature. Thus with change in pressure behind the diaphragm of the valve 14, the diaphragm will move with respect to the weir to close off or increase the supply of hot tempered air from conduit 12 through the valve to the mixing chamber.

The regulator 54 includes at its inlet from the pickoff supply tube 23 a valve closure member 63 which controls the rate of flow of air from the pickoff tube into a chamber 70 of the regulator. Valve 63 is connected to a spring loaded diaphragm 64 dividing the regulator 54 into a pressure chamber and a spring chamber with the pressure chamber 70 on the under surface of the diaphragm common with the valve closure member 63 being connected respectively to the thermostat and the motive chamber of the valve 14. This air flow regulator responds to the pressure of air supplied to the warm air valve to effect a control on the valve 14 in accordance with the setting of the spring 71 positioned in the spring chamber of the regulator which spring is adjusted by means of an adjusting screw 65. The valve closure member is characterized and air supplied under pressure will act against the diaphragm 64 to offset the effect of the spring 71 and is aided by a spring in the pressure chamber 70 such that air flow to and from the pressure chamber 70 will be adjusted with variation in pressure supplied to the pickup tube 23 or on the inlet side of the valve 14. The pressure regulator is necessary to take care of the non-linear operating characteristics of or flow through the main valve 14 with pressure variations applied to the inlet side of the same and its motive chamber. The regulator valve 63 is characterized to provide a flow characteristic which will compensate for the non-linear characteristics of the main valve to provide for a constant flow of air through the main valve 14 with inlet pressure variations at the valve 14 assuming a constant temperature response at the thermostat 55. The spring rates of the springs and the characterization of the valve plug normally provide that a state of equilibrium is reached in the regulator valve with inlet pressure changes. Thus as pressure inside the chamber 70 increases with an increase in supply pressure in duct 12, the diaphragm 64 is moved against the force of the spring 71 to move the valve member 63 and increase the rate of flow or the pressure in the chamber 70 increasing the pressure in the valve chamber with no change in thermostat setting to effect a closure on the valve 14 hence regulating the flow therethrough. The control air under pressure in the chamber 70 is also bled from the thermostat. With a constant supply pressure applied from duct 12 through pickup tube 23, pressure in chamber 70 controlling the motive chamber in the valve 14 or under the diaphragm 15 thereof will be controlled by thermostat position and hence will regulate the flow through the valve in accordance with space temperature requirements. Thus the regulator 54 provides for a constant flow of air through the valve with variation in supply pressure at the inlet side of the valve or in duct 12 which flow is reset or controlled by the thermostat in accordance with temperature requirements of the space.

*Operation*

As previously stated air is supplied to unit blender 10 through conduits 11 and 12 from supply sources not shown. The temperature of the air received by both hot and cold supplies depends upon the overall conditions existing with respect to the heat loss of the space in which the temperature is being controlled. For example, on a hot day requiring cooling the temperature of the air furnished to the cold supply valve would be low enough to satisfy the maximum cooling needs and it is possible that the temperature of the air furnished to the hot supply valve would be substantially the same as the outdoor temperature as it would only be a means of adding fresh air to the system or recirculated air. During cold weather when the heating load is great, the temperature of the air received by the hot supply is sufficient to meet the maximum heating requirements and the temperature of the air received by the cold supply might be outside air or some proportion between outside and recirculated air.

As air enters mixing chamber 24 through either valve 13 or 14 it is mixed within the mixing chamber, this mixing being substantially improved by partition 26 which causes air from valve 13 to flow around the outer surface of the transition member before it can enter into the opening at the lower end of the member. As the air from the cold supply circulates about transition member 25 it mixes with the hot air from valve 14. Member 25 provides for an efficient transfer of air from the mixing chamber of the unit blender through the discharge opening 30. While the efficient flow of air through the transition member reduces the noise developed, the lining 31, as well as splitters 32 provide a further absorption of the sound to reduce the noise level of the blender. This noise level is further maintained at a low level by maintaining the discharge rate substantially constant, that is, maintaining the pressure differential between mixing chamber 24 and the space at a relatively constant level.

Assuming that the space temperature increases and element 62 decreases the air flow from nozzle 60 to close off the flow of air from the hot supply to valve 14, the pressure in mixing chamber 24 immediately decreases. However, to maintain a relative constant of rate flow from the unit blender the pressure responsive controller 34 senses this change in pressure to open valve 13. Thus referring to FIGURE 4, a decrease in pressure across disc 41 by a decrease in the mixing chamber pressure results in movement of lever 42 as well as valve head 40 to the right to increase the rate of flow from valve seat 35. As air bleeds from conduit 33 the diaphragm of valve 13 moves away from its associated weir to allow an increase in the flow of air from the cold supply. The pressure in the mixing chamber is thus maintained at a level set by the position of bracket 45 of the controller. As the pressure in conduit 33 increases the back pressure on valve head 40 increases and a greater force is required to close the valve. The compensating diaphragm 51 provides for an additional force in step with the force developed by the pressure on disc 41 to compensate for the aforementioned back pressure. The amount of compensation is adjusted by regulating the amount of air that bleeds through valve 53 since the rate of the supply of air from conduit 33 to the underside of the compensating diaphragm 51 is limited by the restricted conduit 52.

An increase in the warm air or hot supply pressure in conduit 12 causes an increase in the mixing chamber pressure as a greater flow takes place through valve 14. An increase in the mixing chamber pressure as sensed by controller 34 closes off cold valve 13 to maintain the predetermined selected mixing chamber pressure. This operation results in warmer air being discharged from the unit blender to satisfy the space temperature setting. At that time the thermostat closes down on nozzle 60 to close valve 14. The pressure then decreases in the mixing chamber and valve 13 opens. To prevent a hunting condition with supply pressure variation the flow regulator 54 is used. The supply of air to the diaphragm of valve 14 is varied depending upon the pressure of the hot supply. The rate of flow is selected as a function of the supply pressure and the plug 63 of the flow regulator, as shown in FIGURE 6, is characterized so that a desired air flow rate exists as a function of the air supply pressure. The rate of flow to chamber 70, as well as valve 14, and thermostat 55 increases when the pressure in chamber 70 increases. Movement of diaphragm 64 to the right further increases the air flow so that with the same amount of bleed existing at the thermostat a different position of the valve diaphragm would exist, thus changing the rate of discharge from valve 14. The flow regulator 54 is adjusted so that upon variations in the supply pressure, everything else remaining the same, substantially the same rate of flow exists from the valve 14 to mixing chamber 24. This adjustment is done by changing the loading on diaphragm 64 through adjustment screw 65.

Thus it will be seen that the pressure regulator or air flow regulator 54 in conjunction with the thermostat 55 in control of the warm air valve 14 provides a single valve which permits a constant volume of air to be discharged for given temperature settings independent of the pressure variations in the air being valved or supplied to the inlet side of the valve 14.

Other modifications, substitutions and equivalents will become apparent upon a study of the specification and drawings and the scope of the invention should be determined only by the appended claims.

I claim as my invention:

1. In air conditioning apparatus for controlling the flow of conditioned air to a space and the temperature of the space, conduit means receiving tempered air and adapted to lead to the space, pressure actuated valve means positioned in said conduit means and controlling the flow of tempered air through said conduit means to the space, air flow regulator means including a first control conduit means, connected to said conduit means ahead of said pressure actuated valve means and responsive to the pressure of the tempered air for supplying air to said pressure actuated valve means in such a direction as to tend to close said pressure actuated valve means as the pressure of the tempered air increases so as to tend to cause a substantially constant flow through said pressure actuated valve means for variable air pressures in said conduit means, and a temperature responsive bleed valve adapted to be responsive to the temperature in said space and connected through a second control conduit means to said pressure responsive means for modifying the pressure on said pressure actuated valve means to vary the flow of tempered air through said pressure actuated valve means to said space in accordance with the temperature in said space.

2. In an air conditioning apparatus for controlling the delivery of air to a space and the temperature of the same; an air mixing chamber having a discharge opening adapted to deliver mixed air to the space to be conditioned; first and second conduit means connected to said mixing chamber and adapted to be connected to sources of air at different temperatures, each of said conduit means including a pressure actuated valve means for controlling the delivery of air through the respective conduit means; pressure supplying means for applying air pressure to each of said pressure actuated valve means for positioning the same; a pressure responsive bleed valve responsive to a pressure condition indicative of the flow of air through said discharge opening; a temperature responsive bleed valve adapted to be responsive to the temperature of the space; third conduit means connecting said pressure responsive bleed valve independently of said temperature responsive bleed valve to the pressure supply means associated with one of said pressure actuated valve means associated with said first conduit means to vary the air pressure applied to said one of said pressure actuated valve means to tend to maintain a constant flow of air through said discharge means independently of the temperature of the space; means including fourth conduit means connected to said second conduit means and the other of said pressure actuated valve means associated with said second conduit means and responsive to the air pressure in said second conduit means at said other pressure actuated valve means to maintain a constant flow of air through said other pressure actuated valve means with varying air pressure in said second conduit means; and fifth conduit means connecting said temperature responsive bleed valve to the pressure supplying means associated with the other pressure actuated valve means of said second conduit means and to said last named pressure responsive means to vary the air pressure applied to said other pressure actuated valve means to vary the air flow from said second conduit means to said mixing chamber in accordance with the temperature requirements of the space.

3. In an air conditioning apparatus for controlling the delivery of air to a space and the temperature of the same; an air mixing chamber having a discharge opening adapted to deliver mixed air to the space to be conditioned; first and second conduit means connected to said mixing chamber and adapted to be connected to sources of air at different temperatures, each of said conduit means including a pressure actuated valve means for controlling the delivery of air through the respective conduit means; pressure supplying means for applying air pressure to each of said pressure actuated valve means for positioning the same; pressure responsive means responsive to a condition indicative of the flow of air through the discharge opening, control bleed valve means included as a part of said pressure responsive means and operated thereby; third conduit means connecting said control bleed valve means to said pressure supply means and to one of said pressure actuated valve means associated with said first conduit means to control the flow of conditioned air therethrough; additional pressure responsive means responsive to a pressure affected by said control bleed valve means and connected to said control bleed valve means to anticipate the effect of a change in pressure within said first conduit means; a temperature responsive bleed valve means adapted to be responsive to the temperature of the space; means including fourth conduit means connected to said second conduit means and the other of said pressure actuated valve means associated with said second conduit means and responsive to the air pressure in said second conduit at said other pressure actuated valve means to maintain a constant flow of air through said other of said pressure actuated valve means with varying air pressure in said second conduit means; and further conduit means connecting said temperature responsive bleed valve to said last named pressure responsive means and said pressure supplying means associated with the other pressure actuated valve means of said second conduit means to vary the flow of air through said other pressure actuated valve means in said second conduit means in accordance with the temperature requirements of the space.

4. In an air conditioning apparatus for controlling the delivery of air to a space and the temperature of the same; an air mixing chamber having a discharge opening adapted to deliver mixed air to the space to be conditioned; first and second conduit means connected to said mixing chamber and adapted to be connected to sources of air at different temperatures, each of said conduit means including pressure actuated valve means for controlling the delivery of air through said conduit means; pressure supplying means for applying air pressure to each of said pressure actuated valve means for positioning the same; a separate control means associated with each of said pressure actuated valve means and physically independent of each other, the control means for the pressure actuated valve means of said first conduit means including a bleed valve, said control means being independent of the temperature of the space and including pressure responsive means indicative of the flow of air through said discharge opening for operating said bleed valve, said just named control means being connected through a first control conduit to said pressure actuated valve means and said pressure supplying means of said first conduit means to position said pressure actuated valve means to maintain the total flow of air through said discharge opening at a selected volume regardless of the temperature of the space; the control means for the pressure actuated valve means of said second conduit means being essentially dependent upon the temperature of the space, and upon the pressure within said second conduit means, said last named control means including air flow regulator means with a regulating valve forming a part of the same being connected through a second control conduit to said second conduit means and responsive to the pressure within said second conduit means so as to tend to maintain a selected flow through the pressure actuated valve means of said second conduit means; and temperature responsive bleed valve means adapted to be responsive to the temperature of the space, said temperature responsive bleed valve means being connected through a third control conduit to said air flow regulator means and said pressure supplying means of said second conduit means to modify said selected flow from said second conduit means to said mixing chamber of air at different temperature than that flowing through said first conduit means to vary the portion of the air from said second conduit means in the total constant flow of mixed air to said space to maintain the space temperature at a desired value.

5. In air conditioning apparatus for controlling the flow of conditioned air to a space and the temperature of the space, conduit means receiving tempered air and adapted to lead to the space, pressure actuated valve means positioned in said conduit means and controlling the flow of tempered air through said conduit to the space, air flow regulator means comprising a pressure chamber having a movable wall and a regulating valve positioned by said movable wall, a fluid connection between said chamber and said conduit means ahead of said valve means to apply to said chamber a pressure dependent upon the pressure of the tempered air whose flow is to be controlled by said pressure actuated valve means so as to move said regulating valve towards open position dependent upon the magnitude of said pressures second conduit means connecting said regulating valve of said regulator means to said pressure actuated valve means to tend to cause said pressure actuated valve means to move towards closed position as the pressure in said conduit means ahead of said pressure actuated valve increases, said regulator valve being so characterized as to provide with said pressure actuated valve means a substantially constant flow through said pressure actuated valve means for variable air pressures in said conduit means, and a temperature responsive bleed valve adapted to be responsive to the temperature in said space and connected through a third conduit means to said regulator means to modify the effect of said air flow regulator to cause said flow through said pressure actuated valve means to be modified in accordance with the temperature of said space.

6. In an air conditioning apparatus for controlling the delivery of air to a space and the temperature of the same; an air mixing chamber having a discharge opening adapted to deliver mixed air to the space to be conditioned; first and second conduit means connected to said mixing chamber and adapted to be connected to sources of air at different temperatures, each of said conduit means including a pressure actuated valve means for controlling the delivery of air through the respective conduit means, pressure supplying means for applying air pressure to each of said pressure actuated valve means for positioning the same; a pressure responsive bleed valve responsive to a pressure condition indicative of the flow of air through said discharge opening; a temperature responsive bleed valve adapted to be responsive to the temperature of the space; third conduit means connecting said pressure responsive bleed valve independently of said temperature responsive bleed valve to the pressure supplying means associated with one of said pressure actuated valve means associated with said first conduit means to vary the air pressure applied to said valve means to tend to maintain a constant flow of air through said discharge means independently of the temperature of the space; and means including fourth conduit means connecting said temperature responsive bleed valve to the pressure supplying means associated with the other pressure actuated valve means associated with said second conduit means to vary the air pressure applied to said other pressure actuated valve means to vary the air flow from said second conduit means to said mixing chamber in accordance with the temperature of the space, said last named connecting means including means responsive to a flow condition for changing the control of said other pressure actuated valve means by said temperature responsive bleed valve.

7. In an air conditioning apparatus for controlling the delivery of air to a space and the temperature of the same, an air mixing chamber having a discharge opening adapted to deliver mixed air to the space to be conditioned; first and second conduit means connected to said mixing chamber and adapted to be connected to sources of air at different temperatures, each of said conduit means including a pressure actuated valve means for controlling the delivery of air through the respective conduit means; pressure supplying means for applying air pressure to each of said pressure actuated valve means for positioning the same; a pressure responsive bleed valve responsive to a pressure condition indicative of the flow of air through said discharge opening; third conduit means connecting said pressure responsive bleed valve to the pressure supplying means associated with one of said pressure actuated valve means associated with said first conduit means to vary the air pressure applied to said valve means to tend to maintain a constant flow of air through said discharge means and being independent of the temperature of the space; a temperature responsive bleed valve adapted to be responsive to the temperature of the space; means including fourth conduit means connecting said temperature responsive bleed valve to the pressure supplying means associated with the other pressure actuated valve means associated with said second conduit means to vary the air pressure applied to said other pressure actuated valve means to vary the air flow from said second conduit means to said mixing chamber in accordance with the temperature of the space; and pressure responsive means also responsive to a pressure affecting total flow of air through the discharge opening included in said last named connecting means for modifying the control of said other pressure actuated valve means by said temperature responsive bleed valve.

References Cited in the file of this patent

UNITED STATES PATENTS

| | | |
|---|---|---|
| 1,408,923 | Bastian | Mar. 7, 1922 |
| 1,455,633 | Lundgaard | May 15, 1923 |
| 1,869,663 | Cartier | Aug. 2, 1932 |
| 1,909,469 | Hubbard | May 16, 1933 |
| 1,996,330 | Goshaw | Apr. 2, 1935 |
| 2,013,766 | Sandvoss | Sept. 10, 1935 |
| 2,040,109 | Spence | May 12, 1936 |
| 2,508,074 | Miller et al. | May 16, 1950 |
| 2,587,815 | Branson | Mar. 4, 1952 |
| 2,835,449 | Joesting | May 20, 1958 |

FOREIGN PATENTS

| | | |
|---|---|---|
| 253,317 | Great Britain | June 17, 1926 |